United States Patent
Hui et al.

(10) Patent No.: US 9,386,458 B1
(45) Date of Patent: Jul. 5, 2016

(54) DATA OFFLOAD USING DISTRIBUTED NETWORK ARCHITECTURES

(71) Applicant: AirHop Communications, Inc., San Diego, CA (US)

(72) Inventors: Yan Hui, San Diego, CA (US); Hanson On, Escondido, CA (US)

(73) Assignee: AirHop Communications, Inc., San Diego, CA (US)

( * ) Notice: Subject to any disclaimer, the term of this patent is extended or adjusted under 35 U.S.C. 154(b) by 486 days.

(21) Appl. No.: 13/801,682

(22) Filed: Mar. 13, 2013

Related U.S. Application Data

(60) Provisional application No. 61/637,188, filed on Apr. 23, 2012.

(51) Int. Cl.
*H04W 16/04* (2009.01)

(52) U.S. Cl.
CPC ........................ *H04W 16/04* (2013.01)

(58) Field of Classification Search
None
See application file for complete search history.

(56) References Cited

U.S. PATENT DOCUMENTS

| | | | |
|---|---|---|---|
| 8,737,222 B2 * | 5/2014 | Sridhar et al. | 370/235 |
| 2012/0263145 A1 * | 10/2012 | Marinier et al. | 370/331 |
| 2014/0044003 A1 * | 2/2014 | Drazynski et al. | 370/252 |
| 2015/0133128 A1 * | 5/2015 | Xiong et al. | 455/444 |

OTHER PUBLICATIONS

Hoadley et al., "Enabling Small Cell Deployment with HetNet", Apr. 2012, IEEE Wireless Communications, all pages.*
Lee et al., "Convergence and Hybrid Information Technology", Sep. 2011, 5th Intenration Conference Chit 2011, all pages.*
Prkic, "Understanding Small-Cell Wireless Backhaul", Apr. 3, 2014, electricdesign[dot]com, all pages.*
Damnjanovic et al., "A Survey on 3GPP Heterogeneous Networks", Jun. 2011, National Taipei University, all pages.*
Hoydis et al., "Green, Cost-effective, Flexible, Small Cell Networks", 2010, IEEE Communications Society MMTC, all apges.*
Frenzel, "Understanding the Small-Cell and HetNet Movement", Sep. 2013, electronicdesign[dot]com, all apges.*
Coldrey et al., "Small-Cell Wireless Backhauling", Sep. 3, 2012, IEEE, all pages.*
Rayal, "What Gates Small Cell Deployments?", Oct. 24, 2011, frankrayal[dot]com, all pages.*
Written Opinion of the International Searching Authority, PCT/CN2012/079069, Feb. 5, 2013, all pages.*
Lopez-Perez, "Enhanced Inter-Cell Interference Coordination Challenges in Heterogeneous Networks", Dec. 7, 2011, Arxiv.org, all pages. (see arxiv.org/pdf/1112.1597.pdf).*

* cited by examiner

*Primary Examiner* — Kwang B Yao
*Assistant Examiner* — Adam Duda
(74) *Attorney, Agent, or Firm* — Van Pelt, Yi & James LLP

(57) ABSTRACT

Techniques for data offload using various distributed network architectures are disclosed. In some embodiments, wireless communications, specifically, system architectures and their implementation of distributed network architectures that can be used to effectively offload the data from the centralized cellular core networks are disclosed. For example, techniques for data offload using a distributed network architecture can be applied to heterogeneous networks (HetNet) that can include macrocells, picocells, femtocells, remote radio heads, and/or access points, and in one or more layers. These techniques can also be applied within so-called cloud-Radio Access Networks (cloud-RAN) networks.

21 Claims, 8 Drawing Sheets

DATA OFFLOAD USING DISTRIBUTED NETWORK ARCHITECTURES

CROSS REFERENCE TO OTHER APPLICATIONS

This application claims priority to U.S. Provisional Patent Application No. 61/637,188 entitled DATA OFFLOAD USING DISTRIBUTED NETWORK ARCHITECTURES filed Apr. 23, 2012, which is incorporated herein by reference for all purposes.

BACKGROUND OF THE INVENTION

The explosive adoption of video-enabled wireless mobile devices has caused an explosion of data traffic and exposed the capacity constraints of conventional wireless network topology.

Conventional wireless network (e.g., cellular network) deployment requires careful planning to maximize frequency reuse, minimize coverage dead zones and minimize inter-cell interference, etc. The deployment is labor intensive due to significant amount of measurements and field trials. To reduce the cost of deployment, many network operators deploy macro cells which provide larger coverage footprint and higher capacity. This approach works when the subscribers' service types are mainly conversational (e.g., voice), interactive (e.g., web browsing, instant messaging, etc.), or low rate streaming. These are the typical service types for 2G (e.g., GSM) and early 3G (e.g., UMTS and CDMA2000/EV-DO) cellular networks in which a macro cell provides adequate quality of service to fulfill a majority of subscribers' needs.

BRIEF DESCRIPTION OF THE DRAWINGS

Various embodiments of the invention are disclosed in the following detailed description and the accompanying drawings.

DETAILED DESCRIPTION

Figure 1:
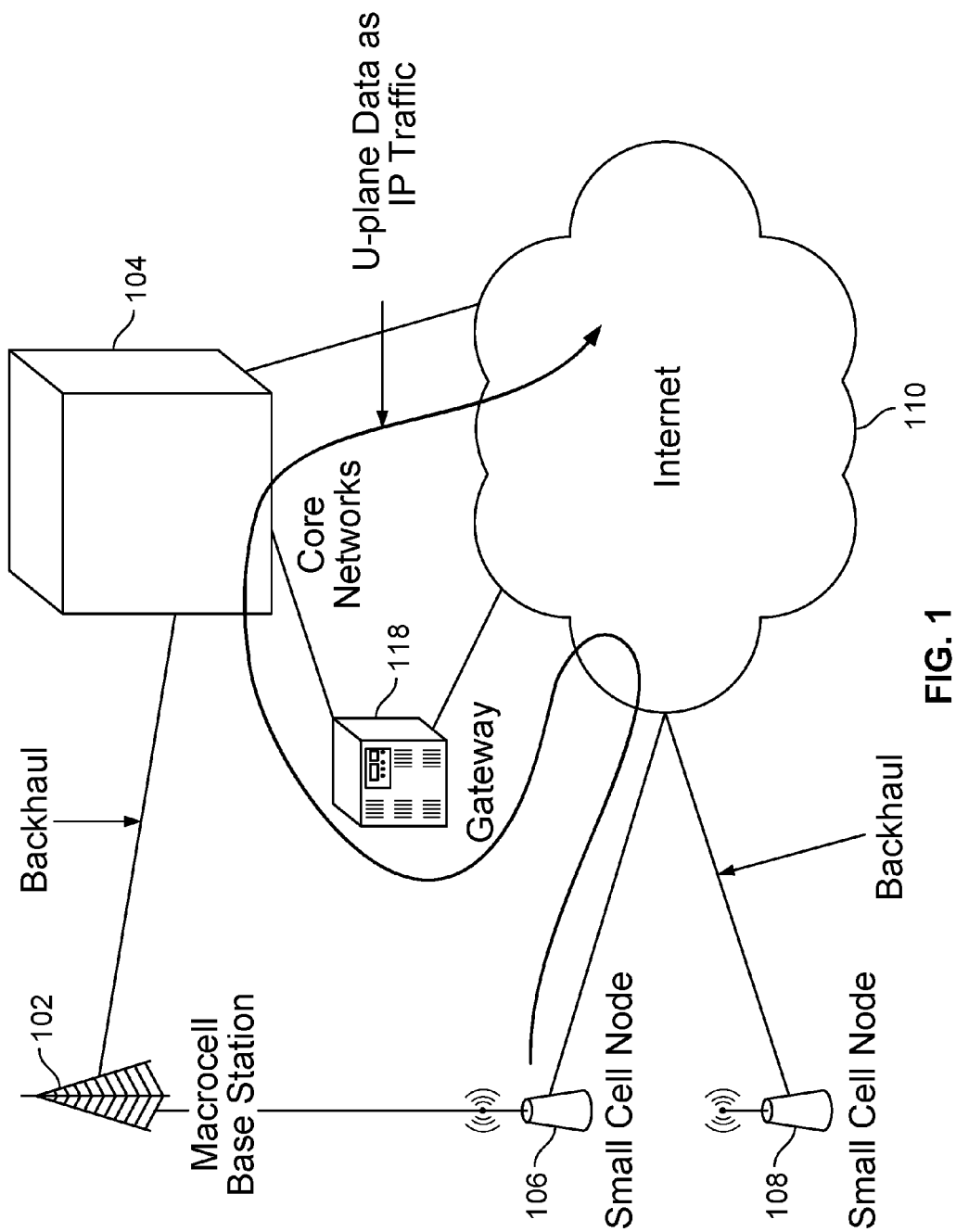
FIG. 1 illustrates a simplified version of a typical network architecture with different type of cells.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The explosive adoption of video-enabled wireless mobile devices has caused an explosion of data traffic and exposed the capacity constraints of conventional wireless network topology.

Conventional wireless network (e.g., cellular network) deployment requires careful planning to maximize frequency reuse, minimize coverage dead zones and minimize inter-cell interference, etc. The deployment is labor intensive due to significant amount of measurements and field trials. To reduce the cost of deployment, many network operators deploy macro cells which provide larger coverage footprint and higher capacity. This approach works when the subscribers' service types are mainly conversational (e.g., voice), interactive (e.g., web browsing, instant messaging, etc.), or low rate streaming. These are the typical service types for 2G (e.g., GSM) and early 3G (e.g., UMTS and CDMA2000/EV-DO) cellular networks in which a macro cell provides adequate quality of service to fulfill a majority of subscribers' needs.

More subscribers demand for faster data service as the bit rate at the air interface increases with the advance of the wireless technology (e.g., 3.5G and 4G). One example of 4G networks is LTE and LTE-Advance (e.g., 3GPP Release 8 and beyond), and another example is WiMax (e.g., IEEE802.16e and beyond). Given the limited available spectrum, the capacity becomes a serious issue for a conventional macro cell. The capacity issue has caused a shift in a cellular network deployment paradigm from well partitioned large coverage macrocells to densely deployed smaller cells (e.g., picocells, remote radio heads, and femtocells, and/or other types of small cells), many being added dynamically in non-fixed locations. Another important strategy to offload data is to use different air interfaces, for example, in unlicensed spectrum such as Wi-Fi hot spots deployment. A mix of such cells and offload hot spots with a combination of different air interfaces is often referred to as Heterogeneous Networks (HetNet). An example HetNet is illustrated in FIG. 1 as discussed below.

FIG. 1 illustrates a simplified version of a typical network architecture with different type of cells. In particular, an example Heterogeneous Networks (HetNet) is illustrated in FIG. 1. As shown, macrocell base station 102 includes a backhaul connection to communicate with centralized core networks (e.g., cellular Packet Core Networks (PCN)) 104. Small cell nodes (e.g., small cells) 106 and 108 also include a backhaul connection (e.g., dedicated connection, DSL, cable modem, point-to-point microwave, and/or other type of Internet connection) with centralized core networks 104. As also shown, centralized core networks 104 is in communication with the Internet 110 and to gateway 108, which is in communication with the Internet 110. However, as discussed below, using this approach, user traffic still needs to be communicated through the PCN, in which user traffic (e.g., U-plane data) is communicated through centralized core networks 104 to then transmit such U-plane data as IP traffic over the Internet 110.

The HetNet paradigm shift aims to provide enough bandwidth from the spectrum and radio frequency (RF) perspectives. However, as illustrated in FIG. 1, the data traffic being offloaded from the macrocells (e.g., except non-carrier grade Wi-Fi) still must pass through the centralized cellular Packet Core Networks (PCN) (e.g., shown as core networks 104 in FIG. 1) via the gateway 108 (e.g., uplink data transmissions can pass from small cell nodes 106/108 to Internet 110 to gateway 108 to core networks 104, and downlink data transmissions can pass from core networks 104 to the gateway 108 to Internet 110 to small cell nodes 106/108). Cellular PCN generally provides mobility management, session management, and transport for Internet Protocol (IP) packet services in cellular networks. Cellular PCN also provides support for other additional functions such as billing and/or other functions and services. This approach places a significant burden on both the backhaul (e.g., from a base station to the PCN) as well as the processing power on the PCN, both of which can result into proportionally higher capital expenditures (CAPEX) and operating expenses (OPEX) costs for network operators.

Some technologies have been proposed to attempt to address these issues. However, none of these proposed technologies have been able to solve these issues simultaneously and cost effectively. For example, residential femtocells are being used to offload the data through users' existing broadband services as backhaul. That approach offloads the traffic from the macrocell backhaul. However, user traffic still needs to pass through the PCN, such as is illustrated in FIG. 1 as discussed above. Another example is to use picocells with dedicated backhaul such as fiber connections. Even though this approach offloads the macrocell backhaul, it requires its own backhaul, which essentially offsets the benefits of offload from backhaul perspective. This approach also suffers the same problem as residential femtocells in that the user traffic still passes through the PCN.

Figure 2:
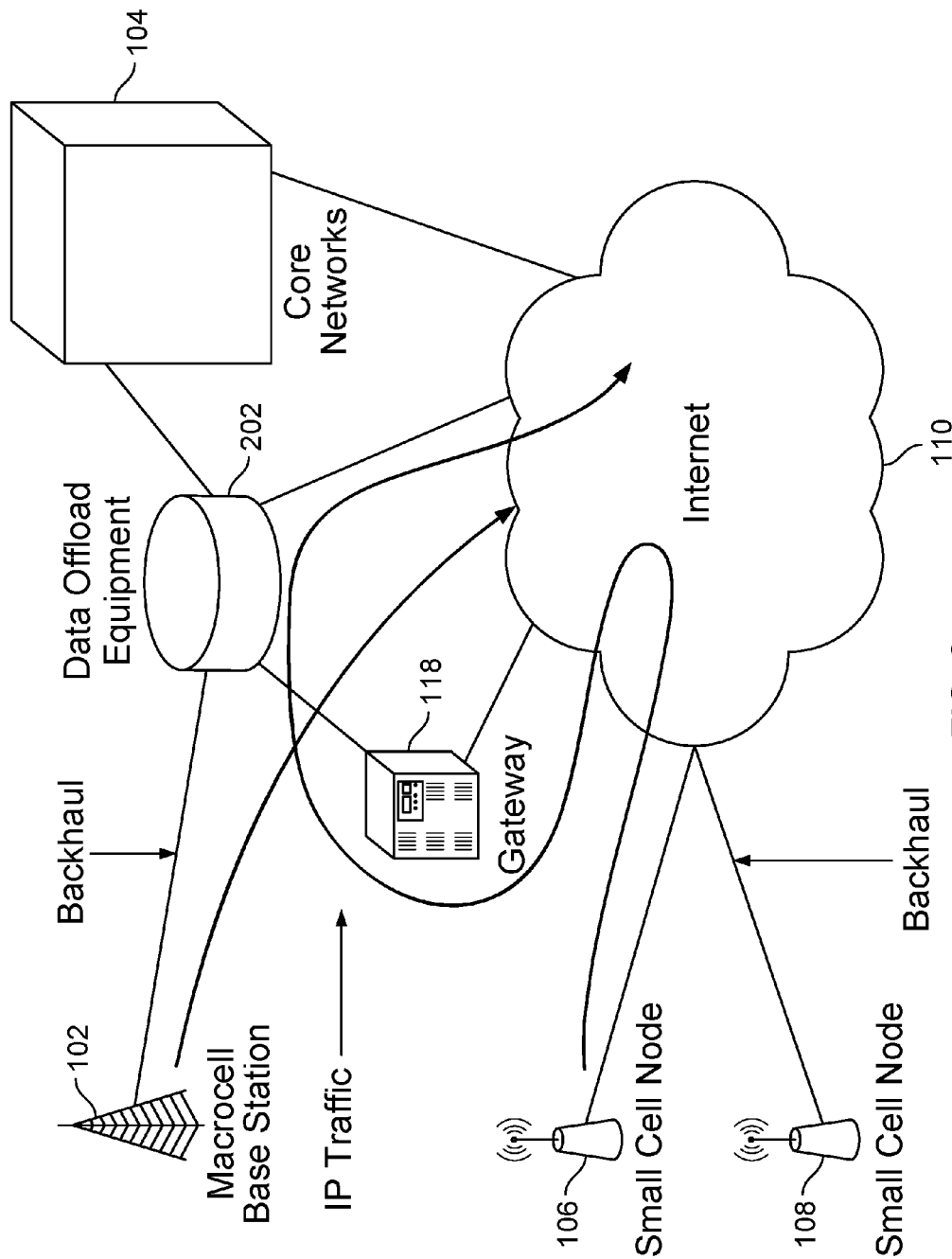
FIG. 2 illustrates a typical data offloading strategy in which data offload equipment is placed between the cellular Packet Core Network (PCN) and base stations in which the IP traffic from user plane is offloaded before reaching the PCN.

FIG. 2 illustrates a typical data offloading strategy in which data offload equipment is placed between the cellular Packet Core Network (PCN) and base stations in which the IP traffic from the user data plane is offloaded before reaching the PCN. In particular, as shown in FIG. 2, another example is to provide a dedicated gateway, shown as data offload equipment 202, in the backhaul path to offload the user traffic directly to the Internet 110 before it reaches centralized PCN 104 usually by using deep packet inspection (DPI) or by decoding the traffic in order to separate traffic data. This approach reduces the cost on the PCN side but makes the network more complicated and increases costs (e.g., due to the costs of adding new data offload equipment).

Thus, what are needed are new and improved techniques for data offload using distributed network architectures. Accordingly, techniques for data offload using various distributed network architectures are disclosed. In some embodiments, wireless communications, specifically, system architectures and their implementation of distributed network architectures that can be used to effectively offload the data from the centralized cellular core networks are disclosed. For example, techniques for data offload using a distributed network architecture can be applied to heterogeneous networks (HetNet) that can include macrocells, picocells, femtocells, remote radio heads, and/or access points, and in one or more layers. These techniques can also be applied within so-called cloud-Radio Access Networks (cloud-RAN) networks.

In some embodiments, a network system, the associated architectures, and its implementation are provided. For example, a network system that can significantly reduce the complexity and cost of the overall network by: 1) implementing a distributed PCN function close to the base stations; 2) using a low cost wireless backhaul, such as TV white space (TVWS) or Wi-Fi as a communication medium; and/or 3) implementing one or more of the following functions in or close to the base stations: Self-Organized Networking (SON), policy management, and traffic segregation.

In some embodiments, system architectures and their implementation of a distributed network for effectively offloading the data from the centralized cellular core networks are disclosed. In some embodiments, a system for data offload using a distributed network architecture includes base stations, a broadband connection to the Internet, and a connection to a cellular PCN. For example, the base stations can have built-in PCN functionality in addition to various conventional base station functions, such as physical layer, protocol layers, and/or various other conventional base station functions. As such, the user data from terminals as part of a specific air interface can be terminated at the base station. The user data are converted to Internet Protocol (IP) data such that they can be directly transported to IP networks without having to pass through a cellular PCN. The connection between the base station and the PCN can be provided for various tasks such as registration, authentication, and/or other types of signaling as well as potentially higher priority data such as VoIP. For example, this architecture can significantly reduce the traffic load, and as a result, can significantly reduce the complexity and cost of the PCN.

In some embodiments, a system for data offload using a distributed network architecture includes base stations with wireless backhaul, the wireless backhaul nodes with broadband connection to the Internet, and a connection to a cellular PCN. For example, the wireless backhaul nodes can have built-in PCN functionality in addition to various conventional base station functions such as physical layer, protocol layers, and/or various other conventional base station functions. As such, the user data from terminals as part of a specific air interface can be sent from a base station to the wireless backhaul node wirelessly, and then be terminated there. The user data are then converted to Internet Protocol (IP) data such that they can be directly transported to IP networks without passing through a cellular PCN. The connection between the backhaul node and the PCN can be provided for the tasks such as registration, authentication, and/or other signaling as well as potentially higher priority data such as VoIP. For example, this architecture can significantly reduce the traffic load, and as a result, can significantly reduce the complexity and cost of the PCN.

In some embodiments, TV White Space (TVWS) is used for the wireless backhaul. In some embodiments, the above can be used for distributed antenna systems (DAS). In some embodiments, the above system can be connected to Cloud-RAN (C-RAN) systems in which the conventional PCN is part of the centralized C-RAN servers.

In the 3GPP terminology, base stations (BTSs) are also referred to as NodeBs (for 3G UMTS) or eNodeBs (for LTE). The BTSs can also being categorized, by their footprints, capacity, transmit power, and/or other criteria, into, for example, macrocell and small cells such as femtocells, picocells, and/or Remote Radio Heads (RRHs).

In the following description, the neighboring cells refer to the scenario where cells are neighboring to each other, as well as the scenario where cells are overlapped with each other in a multi-tier network, such as picocells or femtocells and a macrocell(s).

In a conventional wireless cellular network, base stations are typically connected to core networks via their own dedicated backhaul (e.g., as shown in FIG. 1). The user data and signaling are processed by Core Networks (CN), and the user data is then passed to IP networks (e.g., the Internet). Small cells (e.g., especially femtocells) are being deployed in recent years where small cell base stations are connected to Core Networks by leveraging existing broadband backhaul in residential homes as well as the IP networks. In such cases, the core network function is implemented in the Core Network in a centralized fashion, such as is illustrated in FIG. 1 as similarly discussed above.

Fast growing mobile data has put a significant burden on the centralized Packet Core Networks (PCN), which result in both implementation complexity increase and cost increase to deploy networks. By taking advantage of the fact that a significant majority of mobile data eventually is transmitted to the Internet, data offloading before the PCN using technologies such as Deep Packet Inspection (DPI) have been developed.

Another approach is to identify the data that will eventually be transmitted to the Internet and separate such data to let that data bypass the PCN, such as is illustrated in FIG. 2. Even though that approach can at least partially reduce the PCN overloading problem, the complexity of such technology (e.g., DPI and/or other technology) results in high cost of the data offloading, which in turn offsets the cost reduction of the PCN.

Accordingly, in some embodiments, small cell base stations are disclosed that use a broadband backhaul to connect to the Internet and then to be connected to the PCN via a gateway, such as discussed below with respect to FIG. 3.

Figure 3:
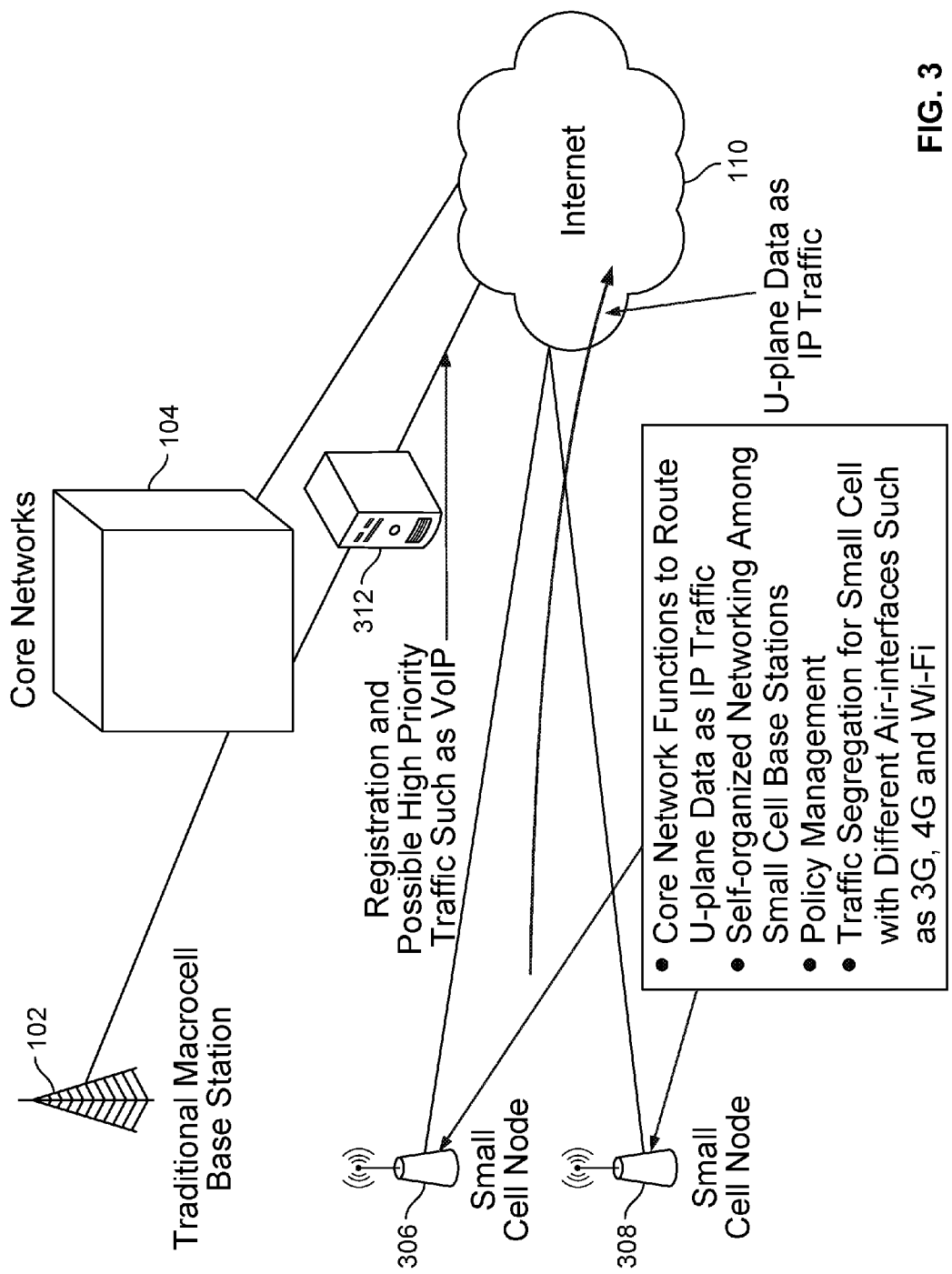
FIG. 3 illustrates an architecture in which small cell base stations are provided that use a broadband backhaul to connect to the Internet, and in which various core network functions and optionally other functions, such as Self-Organized-Networking (SON), policy management, and traffic segregation, are implemented in small cell base stations, in accordance with some embodiments.

FIG. 3 illustrates an architecture in which small cell base stations are provided that use a broadband backhaul to connect to the Internet, and in which various core network functions and optionally other functions, such as Self-Organized-Networking (SON), policy management, and traffic segregation, are implemented in small cell base stations, in accordance with some embodiments. In some embodiments, the core network functions are implemented in small cell base stations 306 and 308 so that user plane data can be directly offloaded to the Internet 110 as IP traffic without passing through the centralized PCN 104 while certain signaling, such as registration and/or other signaling, can still pass through the PCN as shown in FIG. 3. In some embodiments, certain higher priority traffic such as VoIP can be routed to the centralized PCN. In some embodiments, the user registration can still be done via centralized core network (104), but once it is registered, the information can be stored in a local core network entity (312). In some embodiments, various other functions such as Self-Organized-Networking (SON), policy management, and traffic segregation can also be optionally implemented in small cell base stations 306 and 308.

Figure 4:
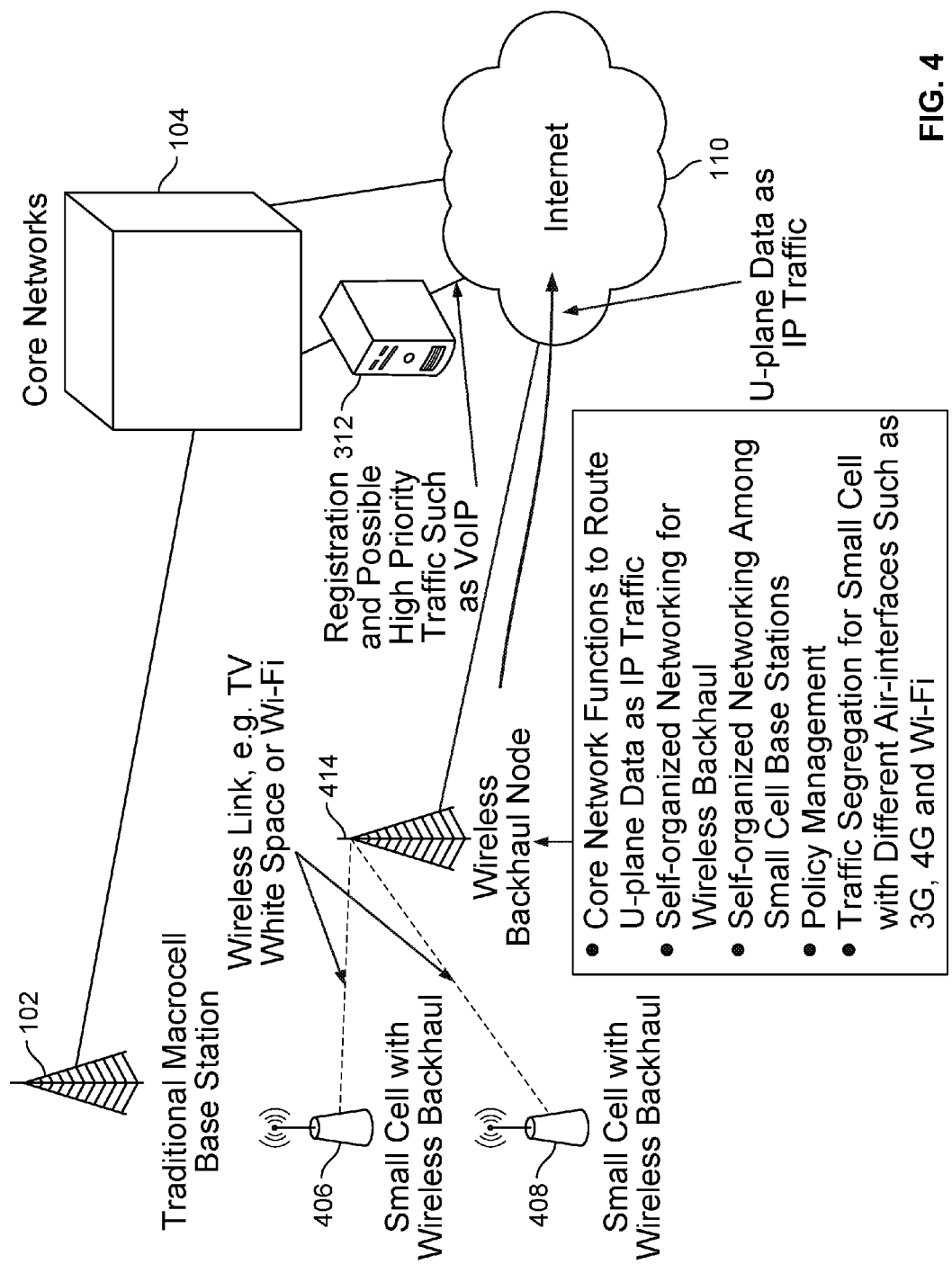
FIG. 4 illustrates another architecture in which small cell base stations are provided that use a wireless backhaul to connect to a centralized backhaul node, which is then connected to the Internet via a broadband backhaul connection, and in which various core network functions and optionally other functions, such as SON, policy management, and traffic segregation, are implemented in the centralized wireless backhaul node, in accordance with some embodiments.

In some embodiments, certain core network functions (e.g., functions that are typically performed by the centralized PCN 104) are implemented in small cell base stations (e.g., small base stations 306 and 308 as shown in FIG. 3) and/or in centralized wireless backhaul nodes (e.g., centralized backhaul node 414 as shown in FIG. 4). In some embodiments, such core network functions include filtering Internet Protocol (IP) traffic from a user plane to send the IP traffic to the Internet (e.g., implementing the packet core functionality to filter the data packets including decoding packets to determine how to route such packets, for example, using radio bearer string(s) (Quality of Service (QoS) classification indicator(s)) and/or other packet core processing without having to transmit such packets to the core networks 104 and without having to use DPI techniques to determine how to route such packets). In some embodiments, such core network functions include converting user data to IP data such that the IP data can be transported to IP networks without having to pass through the centralized cellular core networks. For example, implementing such core network functions in small cell nodes and/or centralized backhaul nodes to route the IP traffic from the user plane can thereby offload such core packet processing from the centralized cellular core networks (e.g., PCN 104). As a result, data traffic transmitted from the base station(s) to the centralized cellular core networks is reduced, and complexity and costs of the centralized cellular core networks is reduced.

Data service is one of the PCN functions that is implemented in small cell base stations and/or in centralized wireless backhaul nodes in accordance with some embodiments, such that the data service function will route user data according to the required IP access service. In one example, an IP access service requires access to an application server, such as user authentication, resides in wireless operator's core network, then the data service function can route the user data to operator's core network. In another example, an IP access service requires access to an application server, such as a search engine, resides in public accessible Internet, then the data service function can bypass wireless operator's core network and route the user data to Internet.

Voice service is another PCN function that is implemented in small cell base stations and/or in centralized wireless backhaul nodes in accordance with some embodiments. For example, the function can handle the circuit-switched voice service and IMS (IP Multimedia Subsystem) voice service separately. The voice service function can route circuit-switched signaling to MSC (Mobile Switching Center) and circuit-switched media to media gateway. For IMS voice services, the voice service function can route SIP signaling to corresponding SIP signaling servers and IMS voice media to a media gateway, respectively.

Messaging service is another PCN function that is implemented in small cell based stations and/or in centralized wireless backhaul nodes in accordance with some embodiments. For example, the function can handle the circuit-switched based messaging, such as SMS (Short Messaging Service), and IP based messaging, such as MMS (Multimedia Messaging Service) separately. The messaging service function can route circuit-switched based messaging to MSC or MME (Mobility Management Entity) and IP based messaging to operator's Messaging-over-IP application server.

FIG. 4 illustrates another architecture in which small cell base stations are provided that use a wireless backhaul to connect to a centralized backhaul node, which is then connected to the Internet via a broadband backhaul connection, and in which various core network functions and optionally other functions, such as SON, policy management, and traffic segregation, are implemented in the centralized wireless backhaul node, in accordance with some embodiments. In some embodiments, small cell base stations 406 and 408 use a wireless backhaul to connect to a centralized backhaul node 414, which is then connected to the Internet 110 via a broadband backhaul connection as shown in FIG. 4. For example, various different air interfaces can be used as wireless backhaul, such as Wi-Fi, microwave, cellular (3G/4G), TV White Space (TVWS), and/or various other air interfaces. In some embodiments, the core network functions are implemented in the centralized backhaul node 414 so that user plane data can be directly offloaded to the Internet 110 as IP traffic without passing through the centralized core networks, shown as PCN 104, while certain signaling, such as registration and/or other signaling, can still pass through the PCN 104 (e.g., via local core network entity 312). In some embodiments, certain higher priority traffic such as VoIP can be routed to the PCN. In some embodiments, various other functions such as Self-Organized-Networking (SON), policy management, and traffic segregation can also be optionally implemented in the centralized wireless backhaul node 414.

In some embodiments, SON software (SW) for wireless backhaul is implemented on a centralized wireless backhaul centralized node. For example, this approach can be used to optimize radio resources shared between all wireless backhaul nodes and also route data in an optimum manner. SON SW for cellular small cell or Wi-Fi can be either be implemented on each small cell base station or on the centralized wireless backhaul node. This approach can also be used to optimize radio resources among the Wi-Fi/small cell base stations. This approach is also illustrated in FIG. 4.

Figure 5:
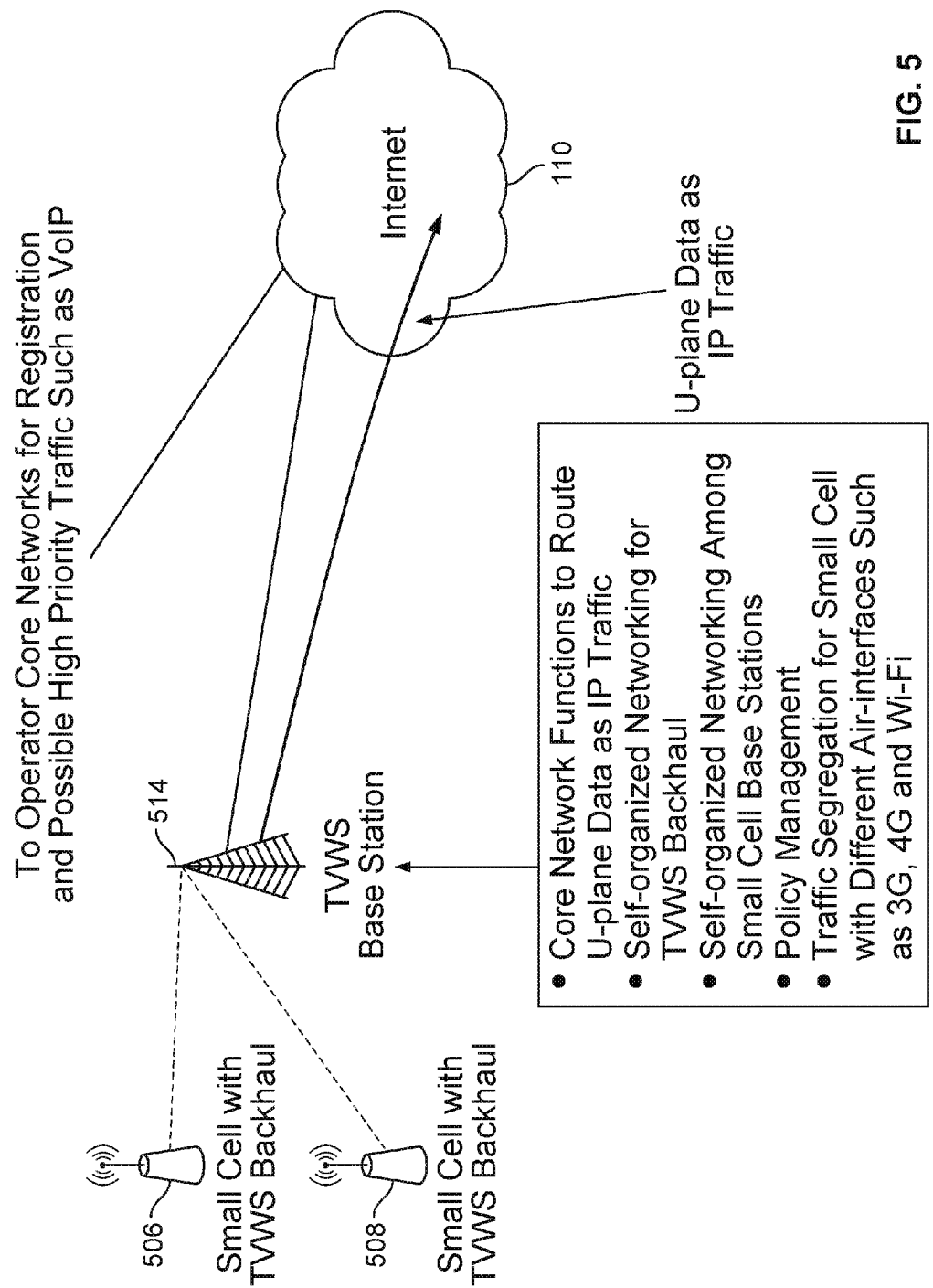
FIG. 5 illustrates another architecture in which small cell base stations are provided that use TV White Space (TVWS) based wireless backhaul to connect to a centralized TVWS node, which is then connected to the Internet via a broadband backhaul connection, and in which various core network functions and optionally other functions, such as SON, policy management, and traffic segregation, are implemented in the centralized TVWS node, in accordance with some embodiments.

FIG. 5 illustrates another architecture in which small cell base stations are provided that use TV White Space (TVWS) based wireless backhaul to connect to a centralized TVWS node, which is then connected to the Internet via a broadband backhaul connection, and in which various core network functions and optionally other functions, such as SON, policy management, and traffic segregation, are implemented in the centralized TVWS node, in accordance with some embodiments. In some embodiments, small cell base stations 506 and 508 use TV White Space (TVWS) based wireless backhaul to connect to a centralized TVWS node 514, which is then connected to the Internet 110 via a broadband backhaul connection as shown in FIG. 5. In some embodiments, the core network functions are implemented in the centralized TVWS node 514 so that user plane data can be directly offloaded to the Internet 110 as IP traffic without passing through the PCN while certain signaling, such as registration and/or other signaling, can still pass through the PCN. In some embodiments, certain higher priority traffic such as VoIP can be routed to the PCN. In some embodiments, various other functions such as Self-Organized-Networking (SON), policy management, and traffic segregation can also be optionally implemented in the TVWS centralized node.

In some embodiments, SON SW for white space backhaul is implemented on a centralized white space node. For example, this approach can be used to optimize radio resources shared between all white space nodes and/or to also route data in an optimum way. SON SW for cellular small cell or Wi-Fi can be either be implemented on each small cell base station or on centralized white space node. This approach can also be used to optimize radio resources among the Wi-Fi/small cell base stations. This approach is also illustrated in FIG. 5.

Figure 6:
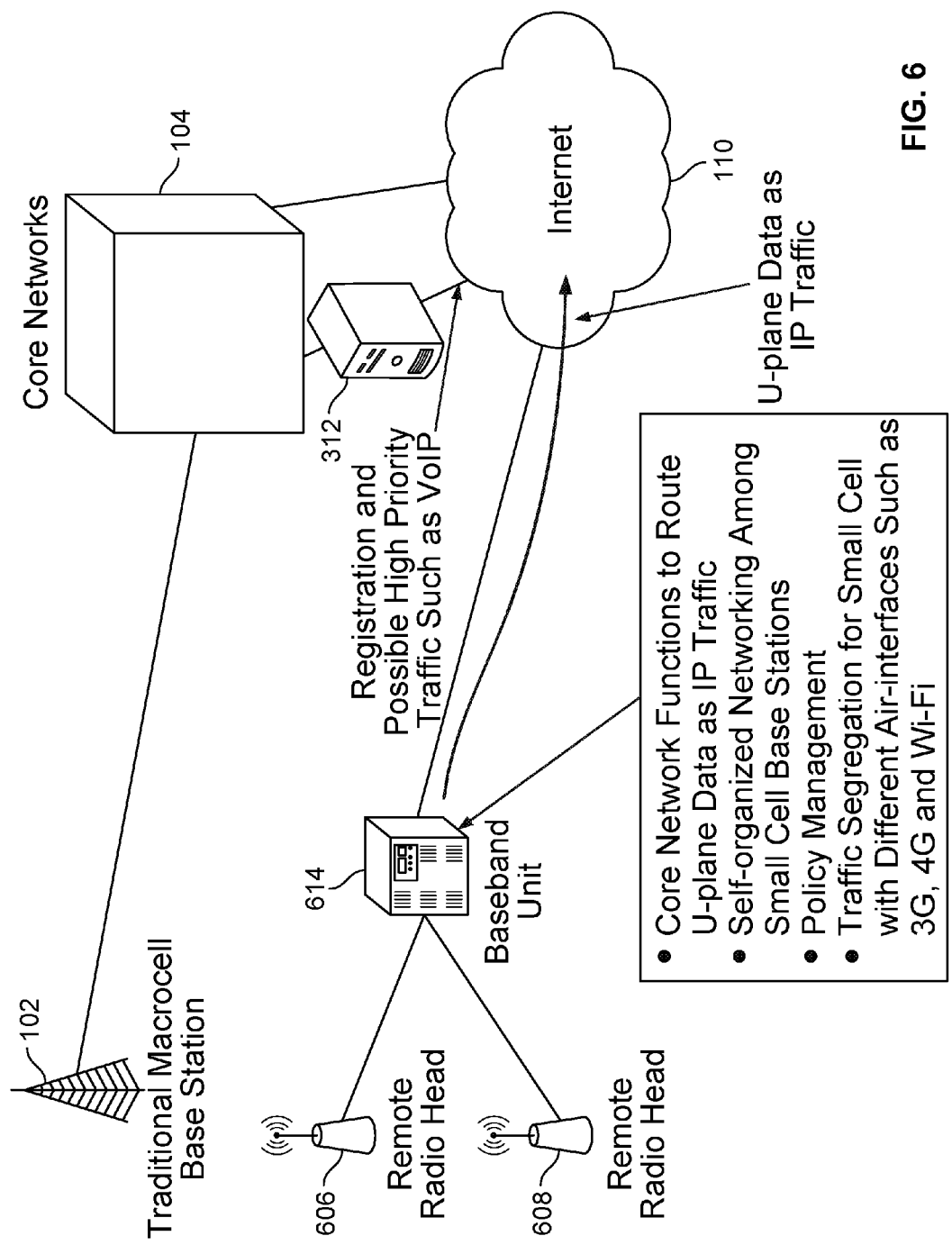
FIG. 6 illustrates another architecture in which small cell base stations are provided that use a Distributed Antenna Systems (DAS) based system in which multiple antenna and RF radio heads are connected to one Baseband Unit (BBU), and in which various core network functions and optionally other functions, such as SON, policy management, and traffic segregation, are implemented in the BBU, in accordance with some embodiments.

FIG. 6 illustrates another architecture in which small cell base stations are provided that use a Distributed Antenna Systems (DAS) based system in which multiple antenna and RF radio heads are connected to one Baseband Unit (BBU), and in which various core network functions and optionally other functions, such as SON, policy management, and traffic segregation, are implemented in the BBU, in accordance with some embodiments. In some embodiments, a small cell base station is implemented as a Distributed Antenna Systems (DAS) based system where multiple antenna and RF radio heads 606 and 608 are connected to one Baseband Unit (BBU) 614 as shown in FIG. 6. For example, the BBU 614 can have either wired or wireless backhaul to connect to the Internet 110 and centralized PCN 104, such as shown in FIG. 3, 4, 5, or 6. In some embodiments, the core network functions are implemented in the BBU 614 so that user plane data can be directly offloaded to the Internet 110 as IP traffic without passing through the centralized PCN 104 while certain signaling, such as registration and/or other signaling, can still pass through the centralized PCN 104. In some embodiments, certain higher priority traffic such as VoIP can be routed to the centralized PCN 104. In some embodiments, various other functions such as Self-Organized-Networking (SON), policy management, and traffic segregation can also be optionally implemented in BBU 614.

Figure 7:
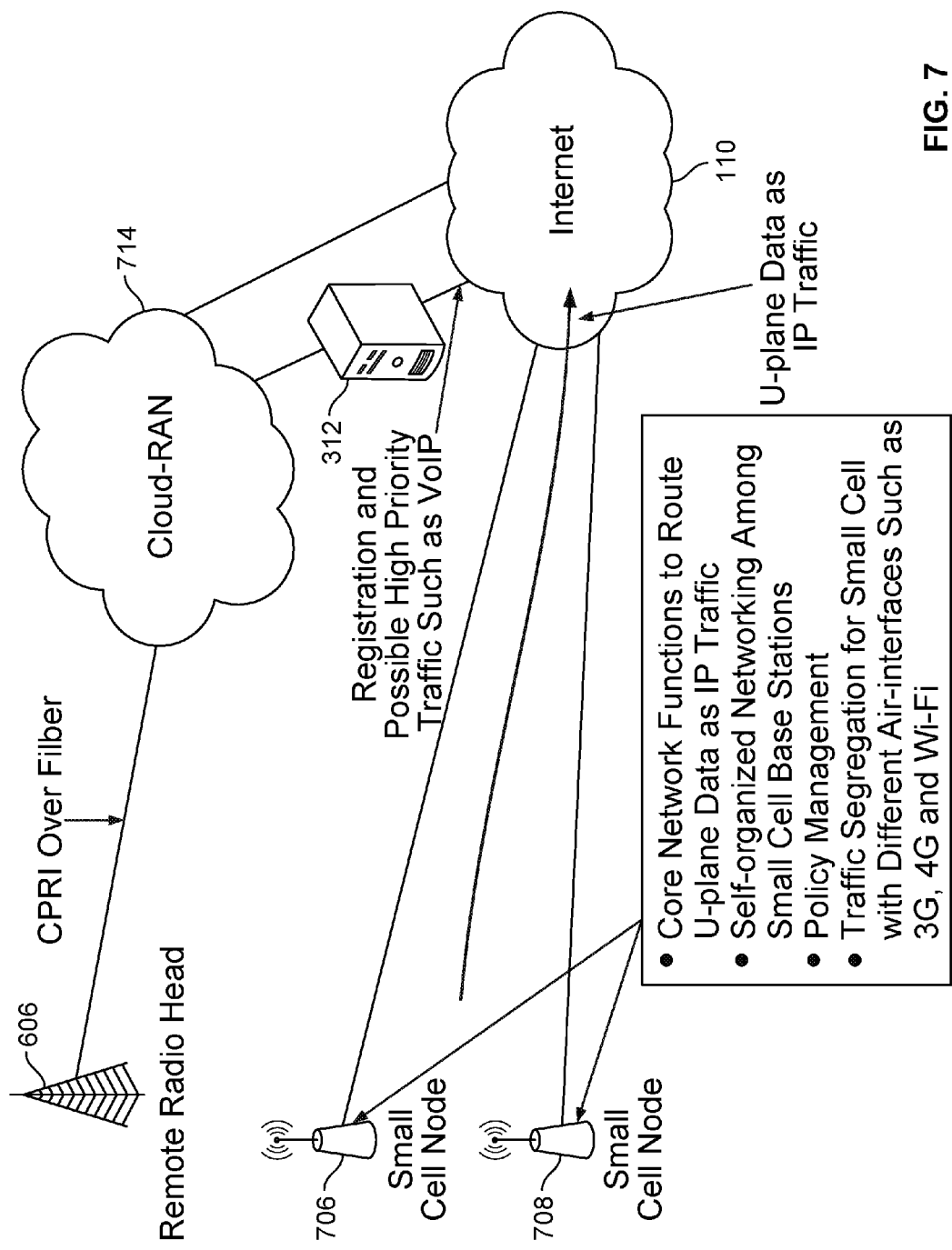
FIG. 7 illustrates another architecture in which small cell base stations are provided as part of a larger Cloud-RAN system in accordance with some embodiments.

FIG. 7 illustrates another architecture in which small cell base stations are provided as part of a larger Cloud-RAN system in accordance with some embodiments. In some embodiments, small cell base stations 706 and 708 are part of a larger Cloud-RAN system 714 as shown in FIG. 7. In some embodiments, Cloud-RAN 714 performs packet processing functions that would typically be performed by a macrocell base station, such that instead of a full-function macrocell base station, a remote radio head 606 can be used to communicate data traffic to the Cloud-RAN 714 via a high speed network interfaces such as Common Public Radio Interface (CPRI) over fiber communications. For example, the core network functions can be implemented in the small cell nodes 706 and 708 so that user plane data can be directly offloaded to the Internet as IP traffic without passing through the PCN while certain signaling, such as registration and/or other signaling, can still pass through the PCN. Some higher priority traffic such as VoIP can be routed to the PCN. For example, the small cell base stations 706 and 708 can have either wired or wireless backhaul to connect to the Internet and PCN, such as shown in Figured 3, 4, 5, or 6. In some embodiments, the core network functions and optionally other functions, such as SON, policy management, and traffic segregation, are implemented in the small cell nodes 706 and 708.

Figure 8:
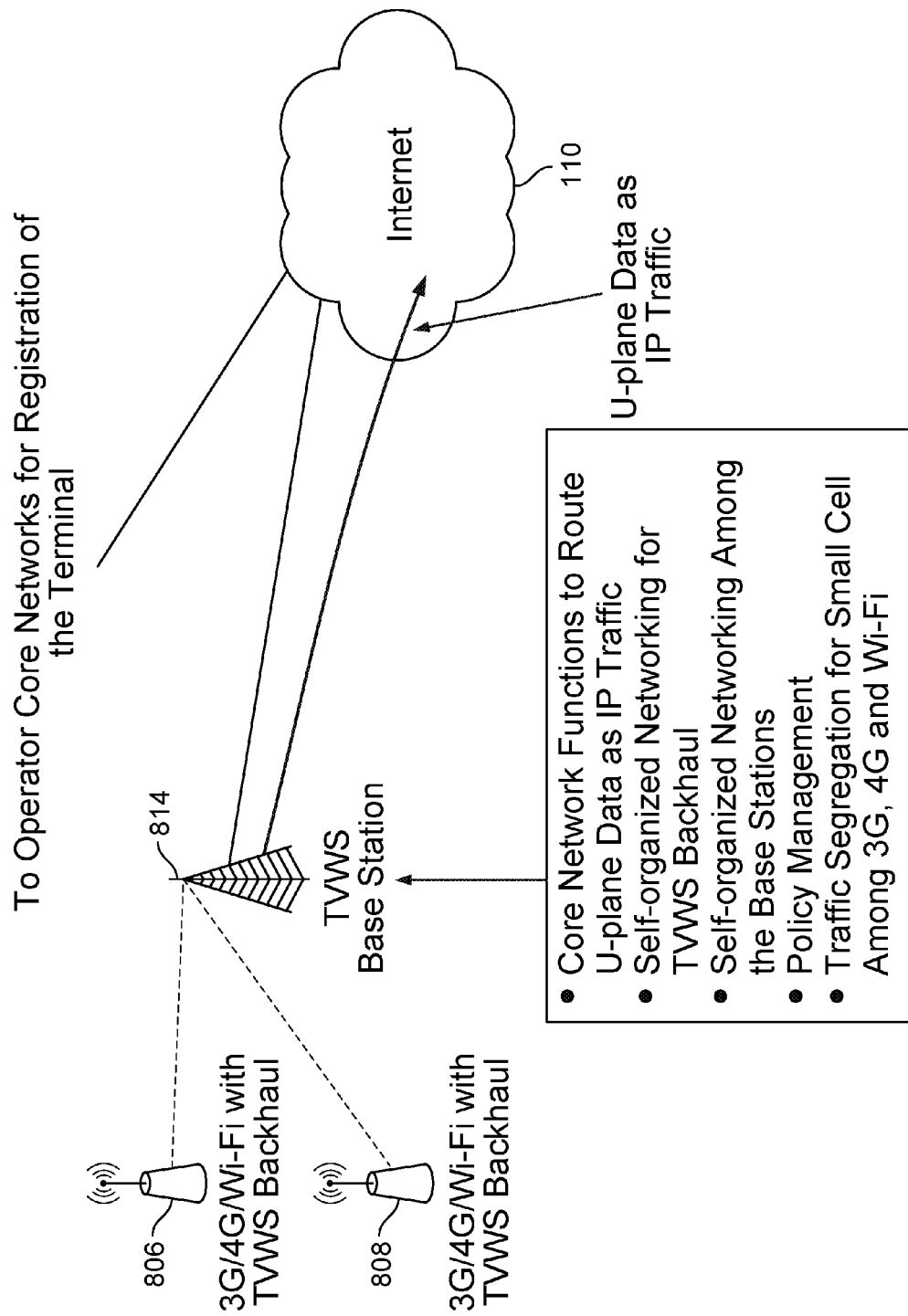
FIG. 8 illustrates a specific system in which small cell base stations are provided that use are each a multimode base station with 3G/4G/Wi-Fi air interfaces, and uses TVWS based wireless backhaul to connect to a centralized TVWS node, which is then connected to the Internet via a broadband backhaul connection in accordance with some embodiments.

FIG. 8 illustrates a specific system in which small cell base stations are provided that are each a multimode base station with 3G/4G/Wi-Fi air interfaces, and uses TVWS based wireless backhaul to connect to a centralized TVWS node, which is then connected to the Internet via a broadband backhaul connection in accordance with some embodiments. In some embodiments, small cell nodes 806 and 808 are each provided as a multimode base station with 3G/4G/Wi-Fi air interfaces, and uses TV White Space based wireless backhaul to connect to a centralized TVWS node 814, which is then connected to the Internet 110 via a broadband backhaul connection, as shown in FIG. 8. In some embodiments, the core network functions and optionally other functions, such as SON, policy management, and traffic segregation, are implemented in the centralized TVWS node 814, such that routing decisions are performed in the TVWS base station node 814 without having to use the centralized core networks for any routing decisions. In some embodiments, the core network functions are completely implemented in the centralized TVWS node 814 so that user plane data can be directly offloaded to the Internet as IP traffic without passing through the PCN. In some embodiments, certain signaling, such as registration and/or other signaling, can still pass through PCN. In some embodiments, various other functions such as Self-Organized-Networking (SON), policy management, and traffic segregation can also be optionally implemented in the TVWS centralized node.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), a text messaging system specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for data offload using a distributed network architecture, comprising:
   a base station, wherein the base station is a microcell, picocell, or a femtocell, the base station comprising a processor configured to:
   receive user plane data from a user plane;
   perform cellular Packet Core Network (PCN) functionality on the user plane data; and
   filter Internet Protocol (IP) traffic from the user plane data to send the IP traffic to the Internet including decoding packets to determine how to route the packets using at least one or more of the following: radio bearer string(s) and Quality of Service (QoS) classification indicator(s), comprising to:
   before performing of the cellular PCN functionality on the user plane data:
   determine whether the user plane data includes the IP traffic based on the at least one or more of the following: the radio bearer string(s) and the Quality of Service (QoS) classification indicator(s); and
   in the event that the user plane data includes the IP traffic, route the packets of the IP traffic from the user plane data to the Internet without performing the cellular PCN functionality on the routed packets, wherein the IP traffic from the user plane is thereby offloaded from centralized cellular core networks; and
   a memory coupled to the processor and configured to provide the processor with instructions.

2. The system recited in claim 1, wherein the base station is a femtocell.

3. The system recited in claim 1, wherein the processor is further configured to:

transmit the IP traffic from the user plane to the Internet using a wireless backhaul node.

4. The system recited in claim 1, wherein the processor is further configured to:
perform Self-Organized-Networking (SON) functionality to optimize radio resources shared between a plurality of small cell nodes and to optimize routing.

5. The system recited in claim 1, wherein the processor is further configured to:
convert user data to Internet Protocol (IP) data such that the IP data can be transported to IP networks without having to pass through the centralized cellular core networks.

6. The system recited in claim 1, wherein the processor is further configured to:
communicate with the centralized cellular core networks to perform a plurality of tasks including one or more of the following: registration, authentication, other types of signaling, and communicating higher priority data.

7. The system recited in claim 1, wherein the processor is further configured to:
communicate with the centralized cellular core networks to perform a plurality of tasks including one or more of the following: registration, authentication, other types of signaling, and communicating higher priority data including Voice over IP (VoIP) data.

8. The system recited in claim 1, wherein data traffic transmitted from the base station to the centralized cellular core networks is reduced.

9. The system recited in claim 1, wherein data traffic transmitted from the base station to the centralized cellular core networks is reduced, and wherein complexity and costs of the centralized cellular core networks is reduced.

10. The system recited in claim 1, wherein the processor is further configured to:
determine a route for the packets without performing Deep Packet Inspection (DPI) of the packets.

11. The system recited in claim 1, wherein the processor is further configured to:
determine a route for the packets using radio bearer string(s).

12. The system recited in claim 1, wherein the processor is further configured to:
determine a route for the packets using Quality of Service (QoS) classification indicator(s).

13. A method of data offload using a distributed network architecture implemented in a base station, comprising:
receiving user plane data from a user plane;
performing cellular Packet Core Network (PCN) functionality on the user plane data, using a processor of the base station, wherein the base station is a microcell, picocell, or a femtocell; and
filtering Internet Protocol (IP) traffic from the user plane data to send the IP traffic to the Internet using the processor of the base station including decoding packets to determine how to route the packets using at least one or more of the following: radio bearer string(s) and Quality of Service (QoS) classification indicator(s), comprising:
before performing of the cellular PCN functionality on the user plane data:
determining whether the user plane data includes the IP traffic based on the at least one or more of the following: the radio bearer string(s) and the Quality of Service (QoS) classification indicator(s); and
in the event that the user plane data includes the IP traffic, routing the packets of the IP traffic from the user plane data to the Internet without performing the cellular PCN functionality on the routed packets, wherein the IP traffic from the user plane is thereby offloaded from centralized cellular core networks.

14. The method of claim 13, wherein the base station is a femtocell.

15. The method of claim 13, further comprising:
transmitting the IP traffic from the user plane to the Internet using a wireless backhaul node.

16. The method of claim 13, further comprising:
performing Self-Organized-Networking (SON) functionality to optimize radio resources shared between a plurality of small cell nodes and to optimize routing.

17. The method of claim 13, further comprising:
converting user data to Internet Protocol (IP) data such that the IP data can be transported to IP networks without having to pass through the centralized cellular core networks.

18. The method of claim 13, further comprising:
communicating with the centralized cellular core networks to perform a plurality of tasks including one or more of the following: registration, authentication, other types of signaling, and communicating higher priority data.

19. The method of claim 13, further comprising:
communicating with the centralized cellular core networks to perform a plurality of tasks including one or more of the following: registration, authentication, other types of signaling, and communicating higher priority data including Voice over IP (VoIP) data.

20. A computer program product for data offload using a distributed network architecture implemented in a base station, the computer program product being embodied in a tangible, non-transitory computer readable storage medium and comprising computer instructions for:
receiving user plane data from a user plane;
performing cellular Packet Core Network (PCN) functionality on the user plane data, using the base station, wherein the base station is a microcell, picocell, or a femtocell; and
filtering Internet Protocol (IP) traffic from the user plane data to send the IP traffic to the Internet including decoding packets to determine how to route the packets using at least one or more of the following: radio bearer string(s) and Quality of Service (QoS) classification indicator(s), comprising:
before performing of the cellular PCN functionality on the user plane data:
determining whether the user plane data includes the IP traffic based on the at least one or more of the following: the radio bearer string(s) and the Quality of Service (QoS) classification indicator(s); and
in the event that the user plane data includes the IP traffic, routing the packets of the IP traffic from the user plane data to the Internet without performing the cellular PCN functionality on the routed packets, wherein the IP traffic from the user plane is thereby offloaded from centralized cellular core networks.

21. The computer program product recited in claim 20, wherein the base station is a femtocell.

* * * * *